(12) United States Patent
Newberg et al.

(10) Patent No.: US 11,668,725 B2
(45) Date of Patent: Jun. 6, 2023

(54) SLIDE RACK CAROUSEL

(71) Applicant: LEICA BIOSYSTEMS IMAGING, INC., Vista, CA (US)

(72) Inventors: Nicholas Newberg, San Marcos, CA (US); Prentash Djelosevic, Oceanside, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 163 days.

(21) Appl. No.: 17/176,890

(22) Filed: Feb. 16, 2021

(65) Prior Publication Data

US 2021/0165005 A1 Jun. 3, 2021

Related U.S. Application Data

(63) Continuation of application No. 16/206,379, filed on Nov. 30, 2018, now Pat. No. 10,948,506.

(Continued)

(51) Int. Cl.
*G01N 35/00* (2006.01)
*G01N 35/02* (2006.01)
*G01N 35/04* (2006.01)

(52) U.S. Cl.
CPC ..... *G01N 35/025* (2013.01); *G01N 35/00029* (2013.01); *G01N 2035/00049* (2013.01); *G01N 2035/00138* (2013.01); *G01N 2035/0425* (2013.01); *G01N 2035/0439* (2013.01); *G01N 2035/0484* (2013.01)

(58) Field of Classification Search
None
See application file for complete search history.

(56) References Cited

U.S. PATENT DOCUMENTS

| 4,795,710 A * | 1/1989 | Muszak | G01N 35/025 |
| | | | 211/163 |
| 6,615,763 B2 | 9/2003 | Edwards | |

(Continued)

FOREIGN PATENT DOCUMENTS

| CN | 111279200 A | 6/2020 |
| JP | 6869435 B2 | 5/2021 |

(Continued)

OTHER PUBLICATIONS

Extended European Search Report dated May 17, 2021 for related European Patent Application No. 18883105.1 in 10 pages.

(Continued)

*Primary Examiner* — Jyoti Nagpaul
(74) *Attorney, Agent, or Firm* — Frost Brown Todd LLP

(57) ABSTRACT

A digital slide scanning apparatus slide rack carousel allows continuous loading and unloading of slide racks into the carousel while the digital slide scanning apparatus is simultaneously digitizing glass slides. The slide rack carousel includes a base having an interior portion of its upper surface at an angle. The slide rack carousel also includes plural rack spacers extending upward from the base and adjacent rack spacers define a rack slot. Each rack spacer also includes a rack stopper on each side such that adjacent rack spacers have rack stoppers facing each other. The rack stoppers prevent a slide rack from moving further toward the center of the carousel than desired.

20 Claims, 16 Drawing Sheets

Related U.S. Application Data

(60) Provisional application No. 62/593,444, filed on Dec. 1, 2017.

(56) References Cited

U.S. PATENT DOCUMENTS

| | | |
|---|---|---|
| 2012/0003065 A1 | 1/2012 | Hirono et al. |
| 2012/0076436 A1 | 3/2012 | Dietz et al. |
| 2013/0071858 A1 | 3/2013 | Bui et al. |
| 2014/0296089 A1* | 10/2014 | Holmes .............. G01N 35/0092 435/7.1 |
| 2015/0292992 A1 | 10/2015 | Enomoto et al. |

FOREIGN PATENT DOCUMENTS

| | | |
|---|---|---|
| WO | WO 2016/189471 A1 | 12/2016 |
| WO | WO 2019/109027 A1 | 6/2019 |

OTHER PUBLICATIONS

Supplementary European Search Report dated Jun. 4, 2021 for related European Patent Application No. 18883105.1 in 1 pages.

International Search Report and Written Opinion dated Feb. 8, 2019 for App No. PCT/US2018/063460, in 7 pages.

International Preliminary Report on Patentability dated Jun. 2, 2020 for App No. PCT/US2018/063460, in 6 pages.

Aperio GT 450, screenshot of Google image search results, accessed on Jan. 17, 2019.

Leica Biosystems: "Leica Aperio GT 450 RUO", uploaded Jul. 30, 2019, retrieved from the internet <https://vimeo.com/350887835>, accessed Sep. 8, 2022.

* cited by examiner

SLIDE RACK CAROUSEL

CROSS-REFERENCE TO RELATED APPLICATIONS

This application is a continuation of U.S. patent application Ser. No. 16/206,379, filed on Nov. 30, 2018, which claims priority to U.S. Provisional Patent Application No. 62/593,444, filed on Dec. 1, 2017, which are both hereby incorporated herein by reference as if set forth in full.

BACKGROUND

Field of the Invention

The present invention generally relates to a digital pathology scanning apparatus and more particularly relates to a carousel that supports plural physical slide racks.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine in order to achieve even better, faster and cheaper diagnosis, prognosis and prediction of cancer and other important diseases.

A digital slide scanning apparatus typically scans a single slide at a time. Some digital slide scanning apparatus have been modified to hold one or more slide racks so that the digital slide scanning apparatus can process tens or hundreds of glass slides. However, these systems are still limited in their capacity. Therefore, what is needed is a system and method that overcomes these significant problems found in the conventional systems as described above.

SUMMARY

Accordingly, described herein is a slide rack carousel for use with a digital slide scanning apparatus that allows for continuous loading and unloading of slide racks into the carousel while the digital slide scanning apparatus is simultaneously digitizing glass slides. As used herein, the term "continuous load" and/or "continuous unload" means loading and unloading of slide racks into the carousel during scanning of a glass slide to generate a digital image of a portion of the glass slide. Advantageously, the slide rack carousel functions to allow for continuous loading and unloading and the slide rack carousel also functions to use the vibration generated by operation of the apparatus to cause the glass slides to move into more stable positions within their respective slide rack in the slide rack carousel and to cause the slides racks to move into more stable positions within their respective slide rack slots in the slide rack carousel.

Also, the housing of the digital scanning apparatus has no door, which results in at least a portion of the carousel always being accessible to an operator in order to facilitate continuous loading and eliminate additional vibration caused by a door. The slide rack carousel also includes a multi-color status indicator for each rack slot.

Accordingly, in an embodiment a digital slide scanning apparatus carousel for holding a plurality of glass slide racks includes a base having a lower surface, an upper surface and an exterior edge, the exterior edge of the base being generally circular from a top view perspective. The carousel also includes a plurality of rack spacers extending upward from the base. Adjacent pairs of rack spacers define a rack slot bordered on three sides by the base, a first side of a first rack spacer and a second side of a second rack spacer. Each rack spacer, respectively, includes a first rack stopper on a first side of the rack spacer, a second rack stopper on a second side of the rack spacer. At least a portion of the upper surface of the carousel base angles downward from a more external position on the base toward a more central position on the base. Additionally, the base is configured to rotate 360 degrees in either direction.

In an embodiment, a digital slide scanning apparatus carousel for holding a plurality of glass slide racks includes a base having a lower surface, an upper surface and a circular shaped exterior edge, the upper surface having an angled central portion and a flat exterior portion. The carousel also includes a plurality of rack spacers extending upward from the base, wherein adjacent pairs of rack spacers define a rack slot bordered on three sides by the upper surface of the base, a first side of a first rack spacer and a second side of a second rack spacer. Each rack spacer respectively comprises a first rack stopper on a first side of the rack spacer and a second rack stopper on a second side of the rack spacer. The carousel also includes a motor configured to drive the base 360 degrees in either direction.

In an embodiment, the motor is configured to drive a rotor 360 degrees in either direction and the rotor is in contact with a belt such that rotation of the rotor in a first direction under control of the motor causes the belt to move the base in the first direction.

In an embodiment, the lower surface of the base includes a cutout and the carousel also comprises three or more v-wheel bearings configured to stabilize the base during rotation. At least one of the v-wheel bearings is adjustable in an embodiment.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a slide rack carousel configured to hold plural slide rack of different heights and from different manufactures. The slide rack carousel allows for continuous slide rack loading and unloading while glass slides are being scanned by the digital slide scanning apparatus. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Example Slide Rack Carousel

Figure 1:
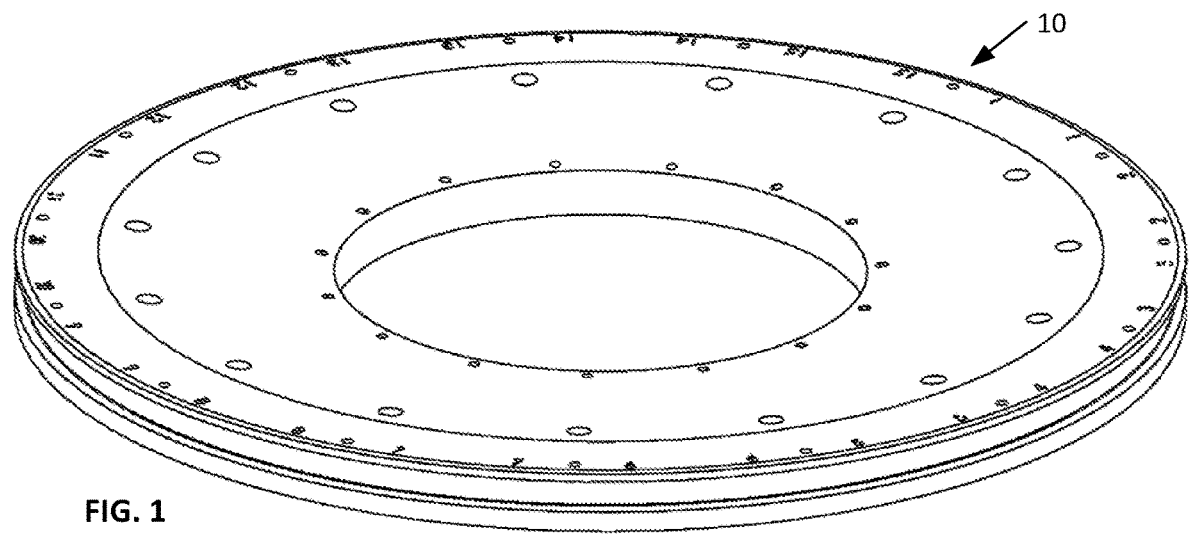
FIG. 1 is a perspective view diagram illustrating an example slide rack carousel base according to an embodiment of the invention.

FIG. 1 is a perspective view diagram illustrating an example slide rack carousel base 10 according to an embodiment of the invention. In the illustrated embodiment the base 10 is substantially circular and is in the form of a ring 400. The base 10 has a lower surface and an upper surface and at least a portion of the upper surface angles downward toward the center of the ring 400.

Figure 2:
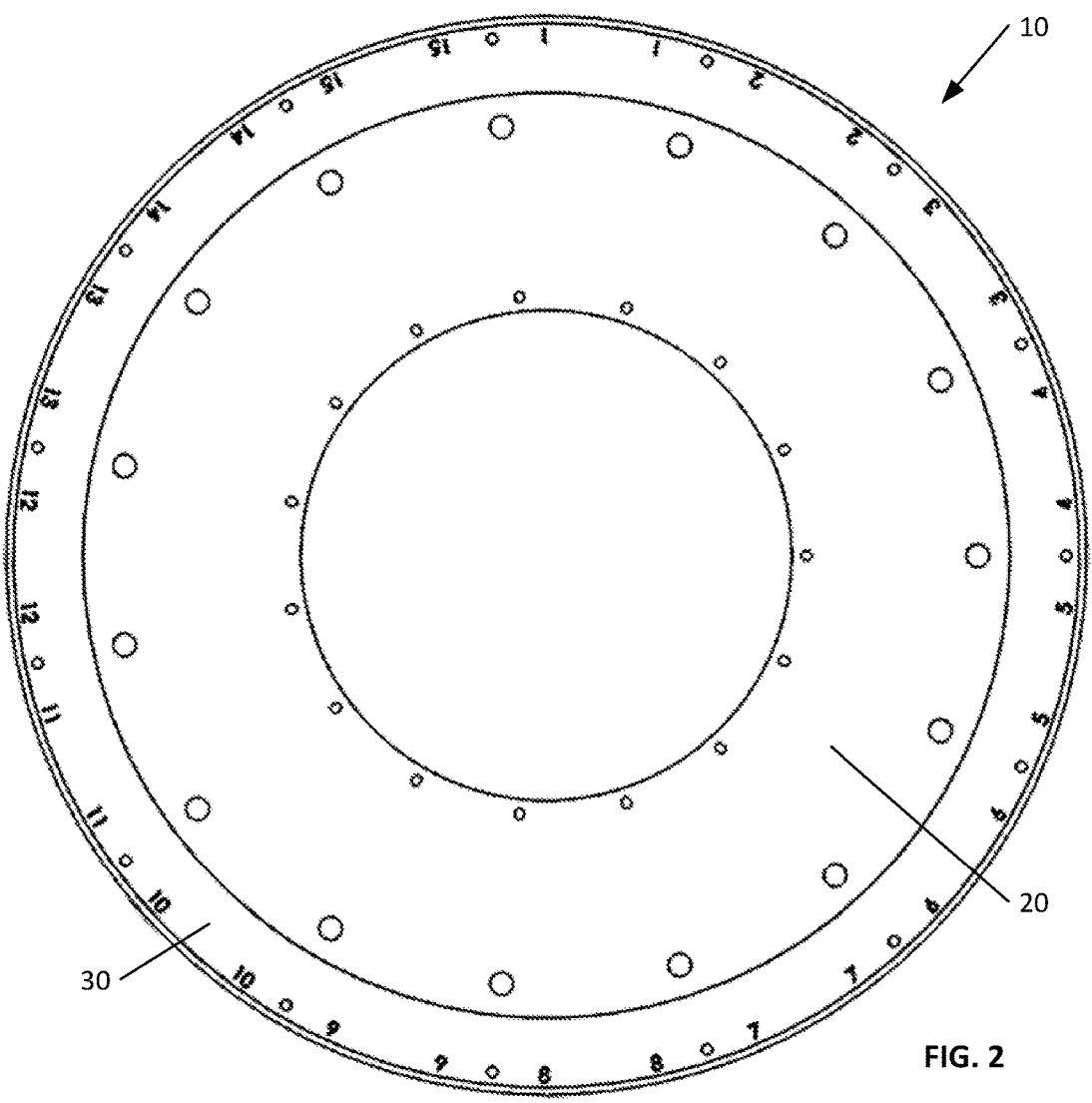
FIG. 2 is a top view diagram illustrating an example slide rack carousel base according to an embodiment of the invention.

FIG. 2 is a top view diagram illustrating an example slide rack carousel base 10 according to an embodiment of the invention. In the illustrated embodiment, the upper surface of the base 10 has an angled portion that is more centrally located and the upper surface of the base 10 also has a flat portion that is more externally located near the perimeter of the circular shaped base 10 that is in the form of a ring 400.

Figure 3:
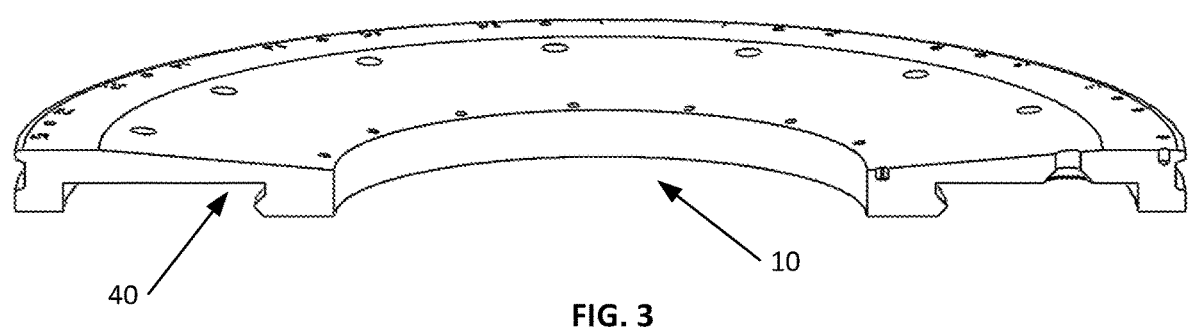
FIG. 3 is a perspective view diagram illustrating an example cross section of a slide rack 300 carousel base according to an embodiment of the invention.

FIG. 3 is a perspective view diagram illustrating an example cross section of a slide rack carousel base 10 according to an embodiment of the invention. In the illustrated embodiment, the based has a cutout 40 in the lower surface, the cutout 40 is configured to allow the base 10 to be secured to a drive that is powered by a motor and thereby moves the base 10 360 degrees in either the left or right direction.

Figure 4:
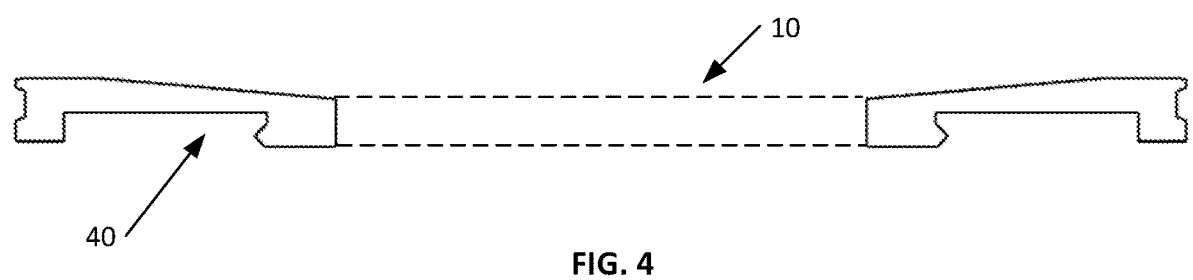
FIG. 4 is a side view diagram illustrating an example cross section of a slide rack carousel base according to an embodiment of the invention.

FIG. 4 is a side view diagram illustrating an example cross section of a slide rack carousel base 10 according to an embodiment of the invention. As shown in the illustrated embodiment, the base 10 is in the form of a ring 400.

Figure 5A:
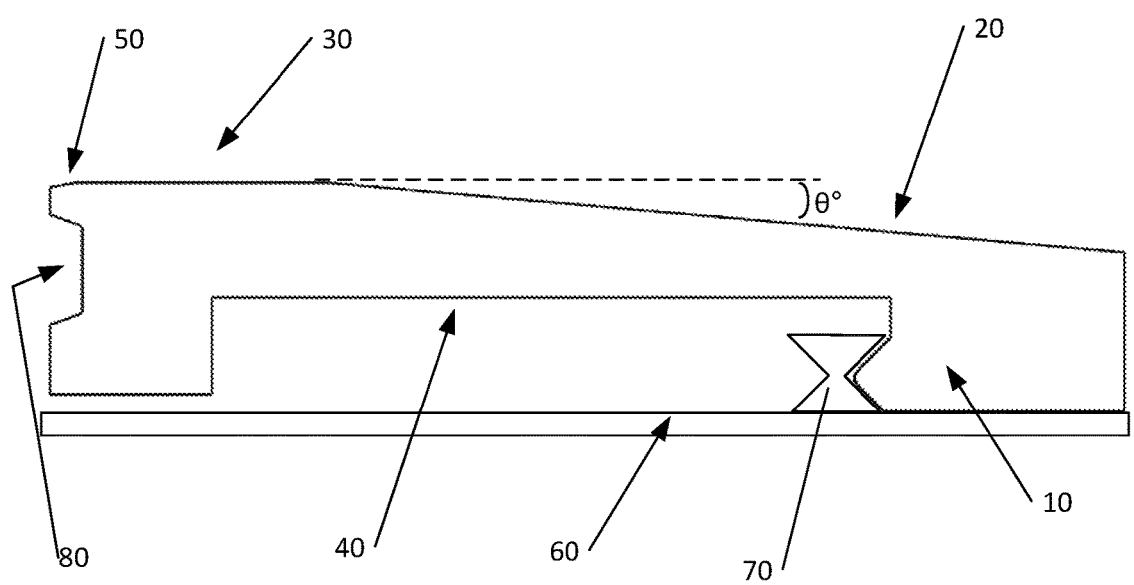
FIG. 5A is a side view diagram illustrating an example cross section of one side of a slide rack carousel base engaged with a v-wheel according to an embodiment of the invention.

FIG. 5A is a side view diagram illustrating an example cross section of one side of a slide rack carousel base 10 according to an embodiment of the invention. In the illustrated embodiment, a portion of the upper surface of the carousel base 10 is flat and the perimeter edge of the upper surface of the carousel base 10 has a bevel. The flat portion of the upper surface is near the perimeter of the upper surface of the carousel base 10. The bevel facilitates loading of slide racks 300 into the slide rack slot 220 of the slide rack 300 carousel. Additionally, a different portion of the upper surface of the carousel base 10 is angled at an angle of 0°. Advantageously, at least a portion of the upper surface of the carousel base 10 is angled and the degree of the angle, 0°, may range from 1° to 10°, or even higher up to 45°. As previously discussed, when a slide rack 300 is positioned on the angled upper surface of the carousel base 10, any vibration induced or other movement of the slide rack 300 is biased toward the center of the carousel where slide rack stoppers 230 prevent further movement of the slide rack 300. Additionally, the individual slides in the slide rack 300 may also experience vibration induced movement or other movement and the angled position of the slide rack 300 in which an individual slide is disposed also positions the individual slide at an angle such that movement of the individual slide is biased toward the center of the carousel where the end of the slide rack 300 prevents further movement of the slide rack 300.

Additionally, the carousel base 10 is supported by a machine base 60 that also supports the digital pathology scanning apparatus. One or more v-wheel bearings 70 are positioned to engage a surface of the cutout 40 in order to maintain the position of the carousel base 10 as it is turned by a belt that is positioned in the belt recess 80.

Figure 5B:
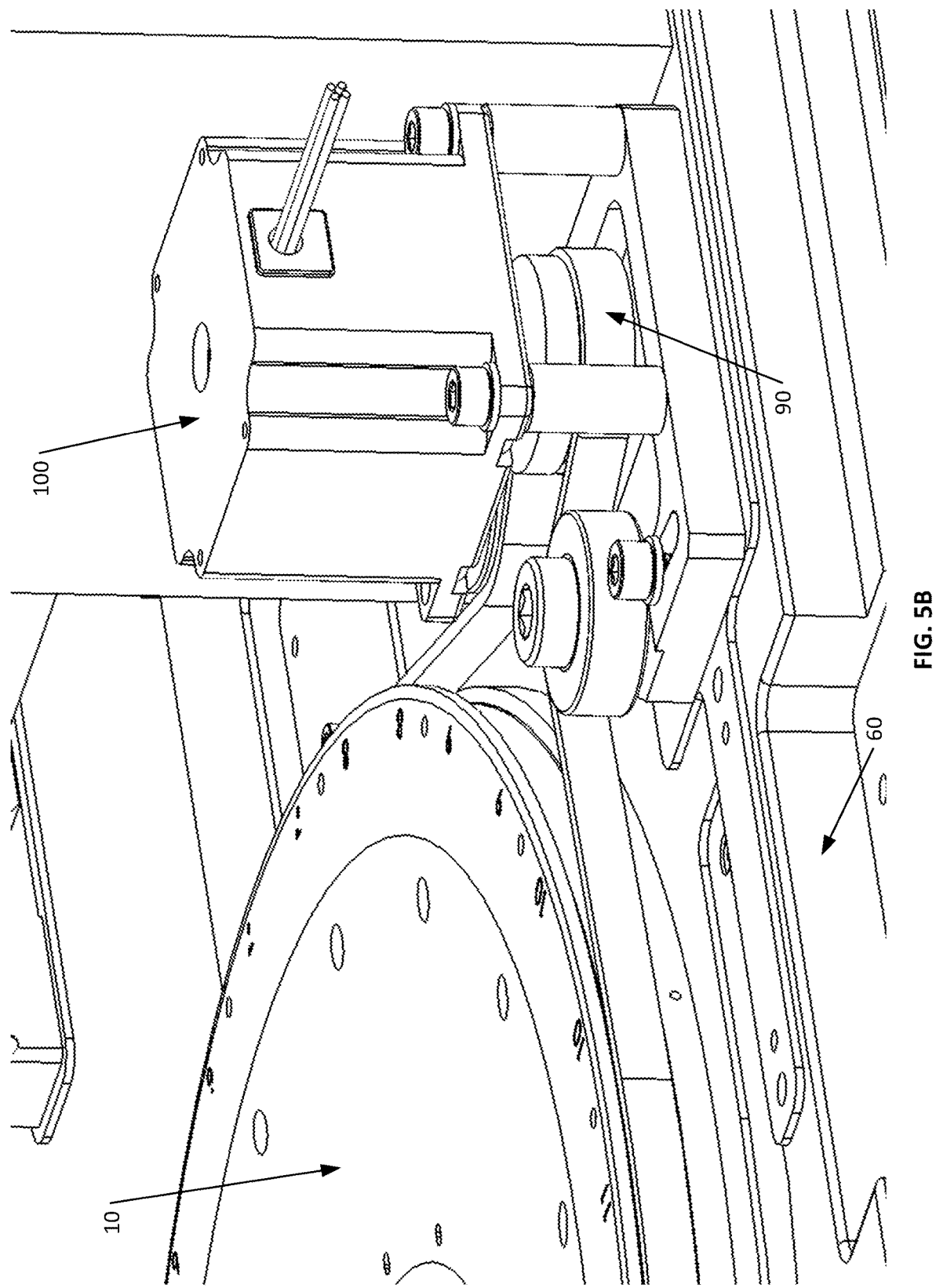
FIG. 5B is a perspective view diagram illustrating an example slide rack carousel base engaged with a carousel belt for turning the carousel base according to an embodiment of the invention.

FIG. 5B is a perspective view diagram illustrating an example slide rack carousel base 10 engaged with a carousel belt 90 for turning the carousel base 10 according to an embodiment of the invention. In the illustrated embodiment, the carousel base 10 is supported by the machine base 60. The machine base 60 also supports a carousel motor 100 that is configured to be controlled by a processor and turn the carousel belt 90 that is engaged with carousel base 10. The turning of the carousel belt 90 advantageously causes the carousel to rotate. The carousel motor 100 is configured to turn the carousel belt 90 in two directions such that the carousel can be rotated left or right.

Figure 5C:
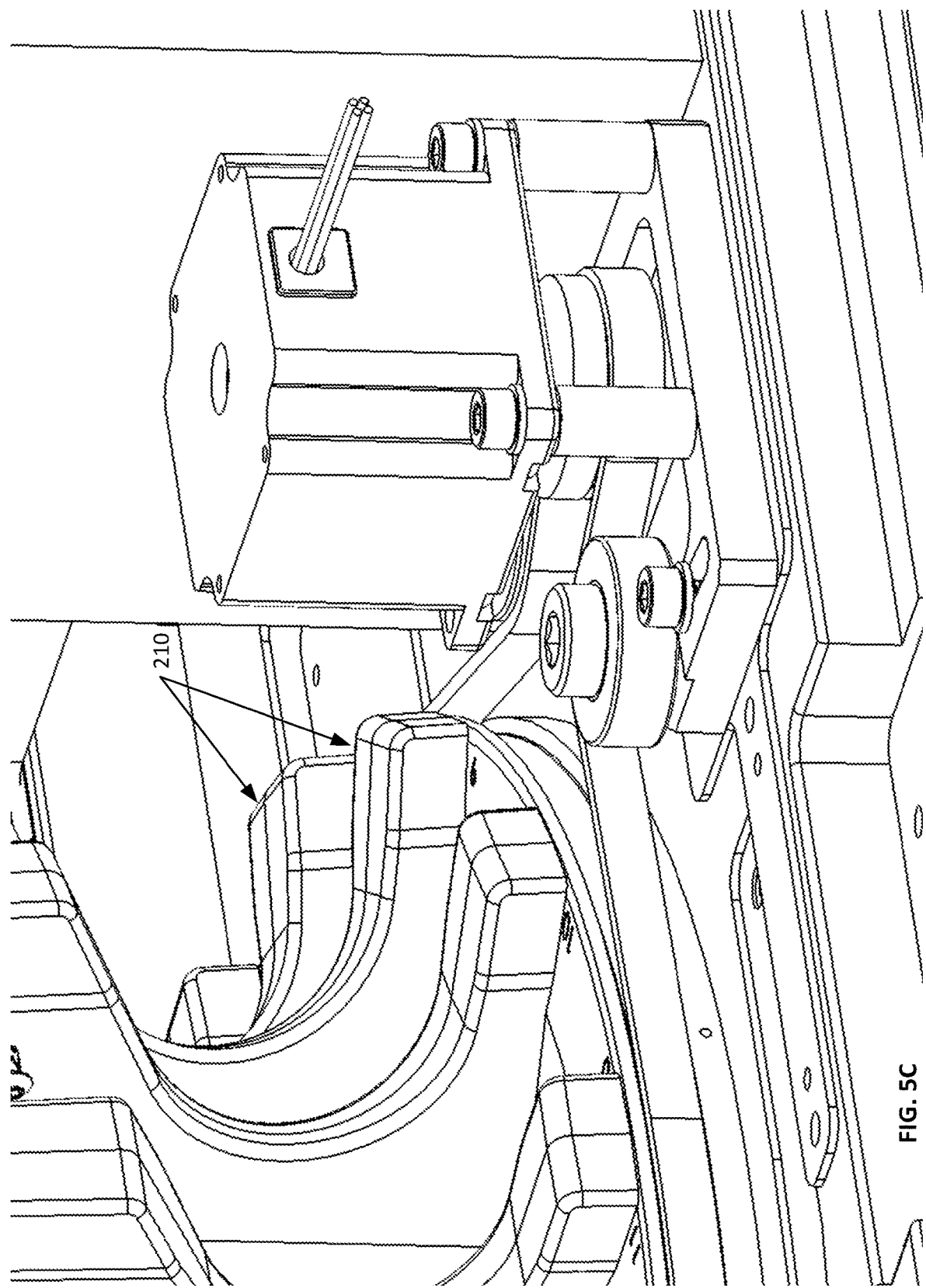
FIG. 5C is a perspective view diagram illustrating an example slide rack carousel base with slide rack spacers engaged with a carousel belt for turning the carousel base according to an embodiment of the invention.

FIG. 5C is a perspective view diagram illustrating an example slide rack carousel base 10 with slide rack spacers 210 engaged with a carousel belt 90 for turning the carousel base 10 according to an embodiment of the invention.

Figure 5D:
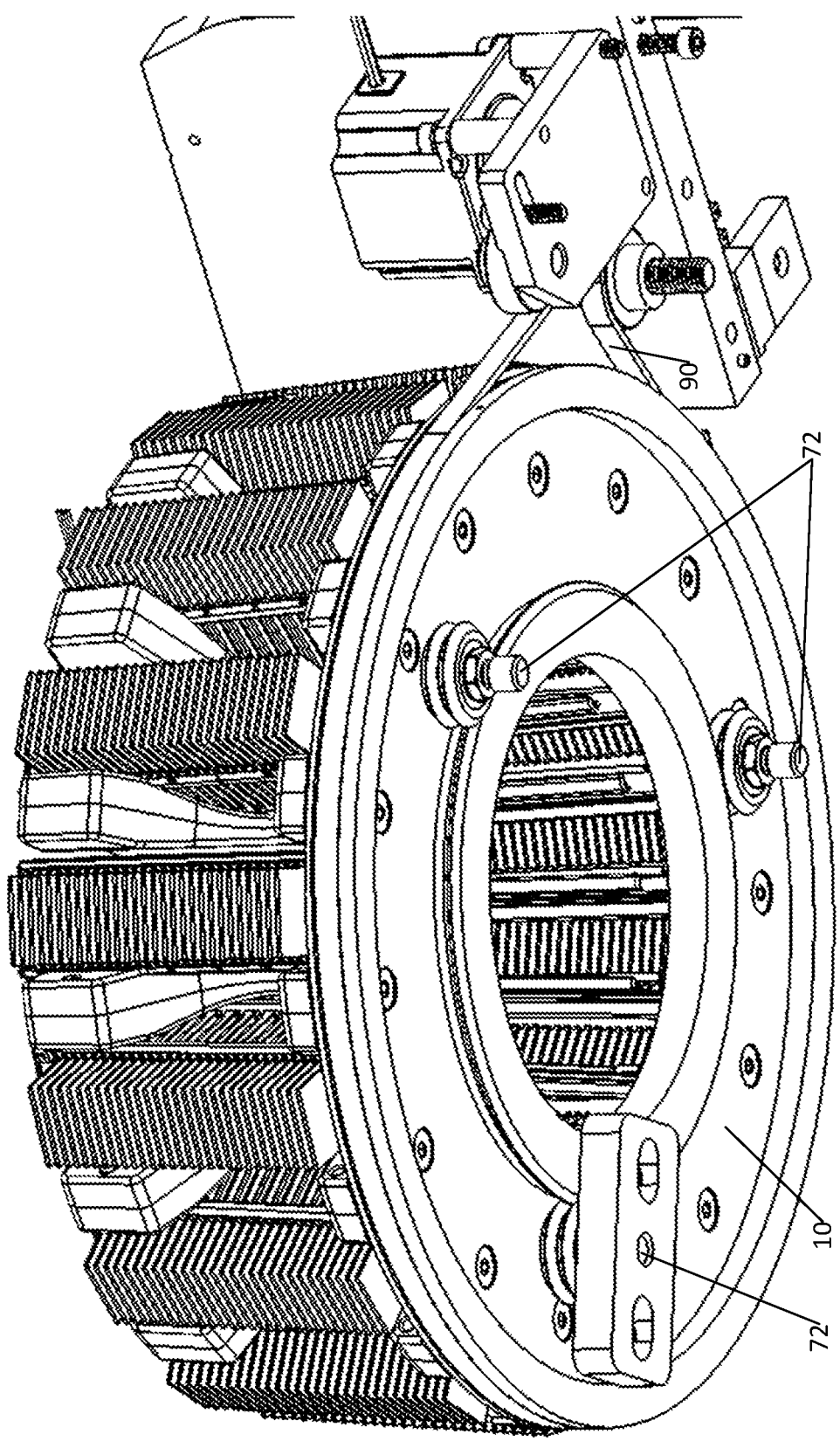
FIG. 5D is a perspective view diagram illustrating an example slide rack carousel base engaged with a plurality of v-wheel bearings according to an embodiment of the invention.

FIG. 5D is a perspective view diagram illustrating an example slide rack carousel base 10 engaged with a plurality of v-wheel bearings 70 according to an embodiment of the invention. In the illustrated embodiment, a plurality of v-wheel bearings 70 are positioned to engage with or be proximal to an interior surface of the cutout 40 of the carousel base 10. In the illustrated embodiment, there are three v-wheel bearings 70 that are advantageously positioned in an opposing triangular orientation to secure the carousel base 10 from lateral movement while allowing the carousel base 10 to rotate. In one embodiment, at least one of the v-wheel bearings 70 is an adjustable v-wheel bearing 72 to allow the initial positioning of the carousel between the opposing v-wheel bearings 70, while the other v-wheel bearings 70 may be non-adjustable v-wheel bearings 74. In alternative embodiments, two or more of the v-wheel bearings 70 may be adjustable. In one embodiment, the v-wheel bearings 70 are secured to the machine base 60 (not shown). In one embodiment, the adjustable v-wheel bearing is manually adjustable and in an alternative, embodiment, the adjustable v-wheel bearing is adjusted under control of a processor.

Figure 5E:
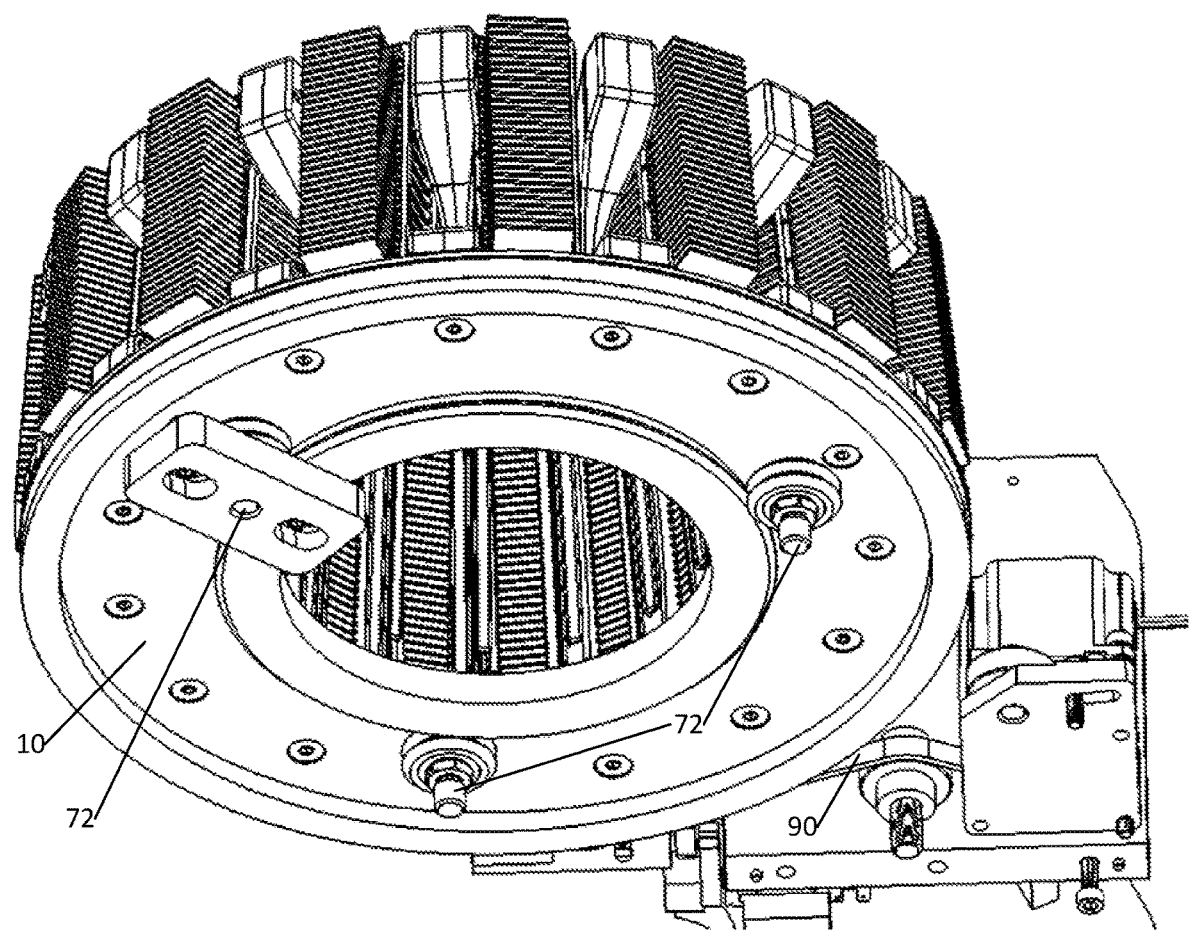
FIG. 5E is an alternative perspective view diagram illustrating the example slide rack carousel base of FIG. 5D engaged with a plurality of v-wheel bearings according to an embodiment of the invention

FIG. 5E is an alternative perspective view diagram illustrating the example slide rack carousel base 10 of FIG. 5D engaged with a plurality of v-wheel bearings 70 according to an embodiment of the invention.

Figure 5F:
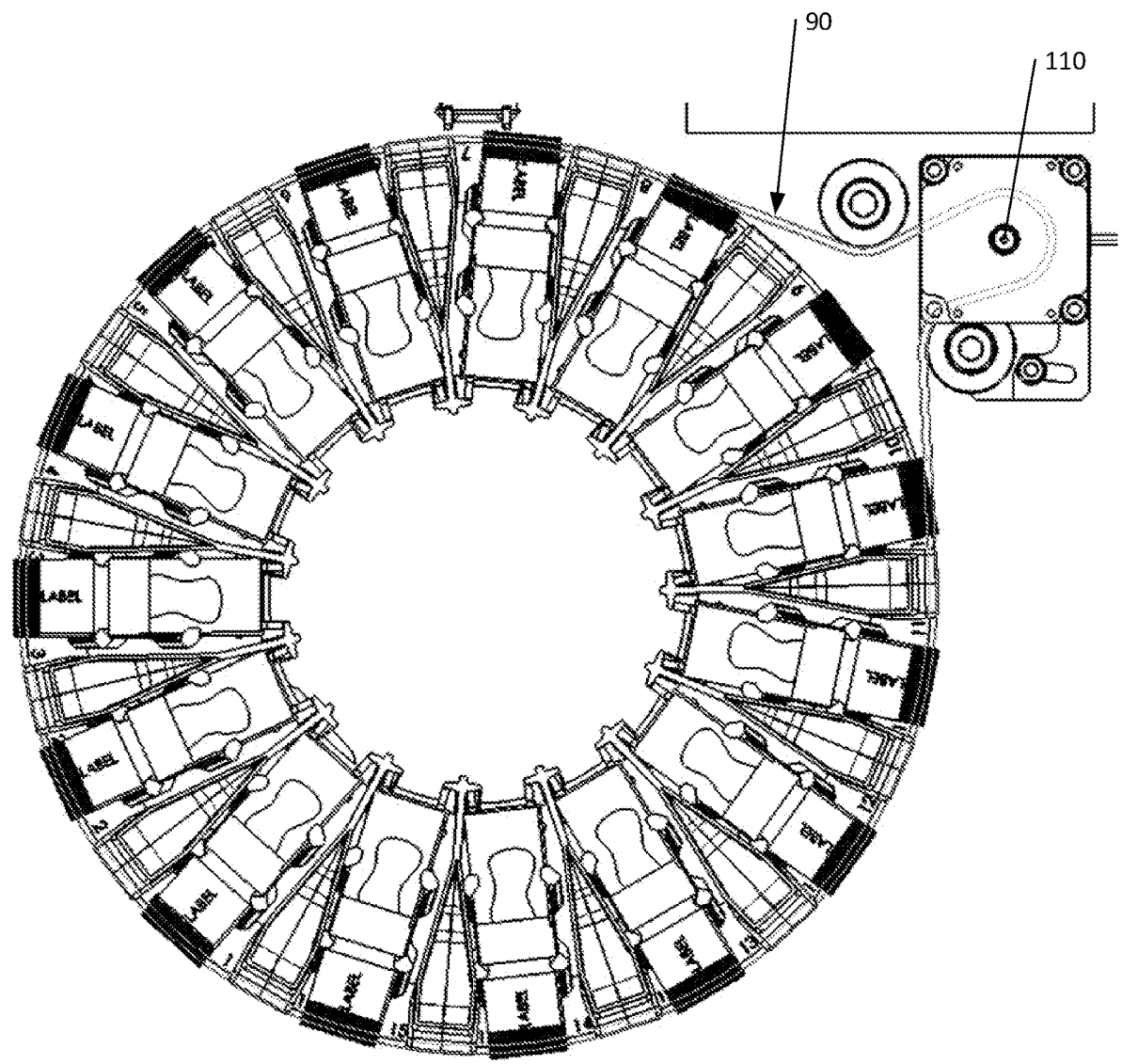
FIG. 5F is a top view diagram illustrating an example slide rack carousel base supported by a machine base and engaged with a carousel belt for turning the carousel base according to an embodiment of the invention.

FIG. 5F is a top view diagram illustrating an example slide rack carousel base 10 supported by a machine base 60 and engaged with a carousel belt 90 for turning the carousel base 10 according to an embodiment of the invention. In the illustrated embodiment, the carousel belt 90 is positioned in a belt recess 80 of the carousel base 10 and the carousel belt 90 extends around the carousel base 10 and the carousel belt 90 also extends around at least one rotor 110 that is turned by a carousel motor 100 (not shown). Advantageously, the carousel motor 100 may operate under control of a processor to turn the rotor 110 in a left direction or a right direction and thereby turn the carousel belt 90 in the left direction or the right direction and thereby rotate the carousel base 10 in the left direction or the right direction.

In alternative embodiments, the carousel base 10 may have a drive system that employs a belt or another mechanism such as direct gearing or direct drive. Advantageously, the drive system may be paired with a variety of types of bearing systems to implement movement of the carousel base 10.

Figure 6:
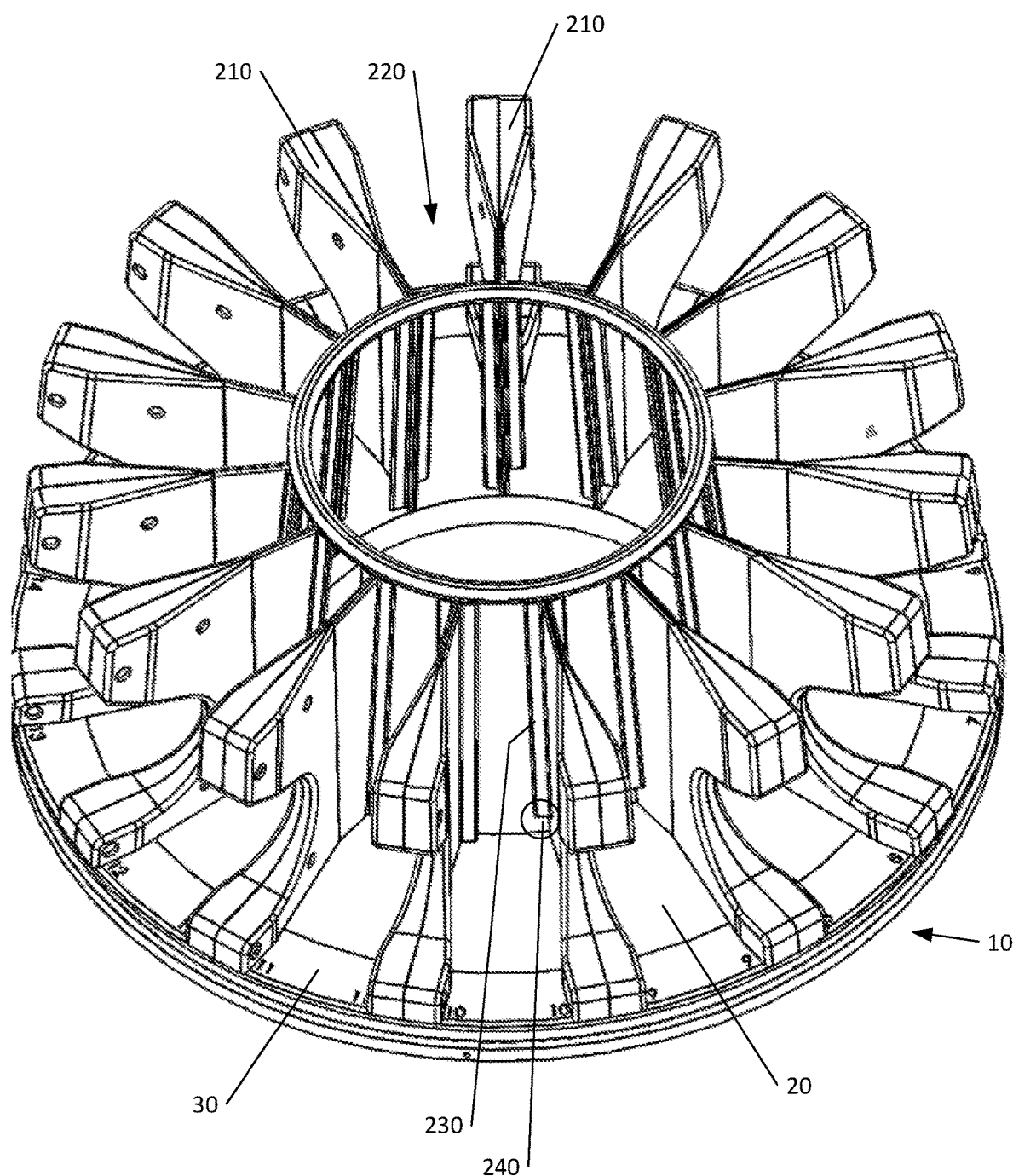
FIG. 6 is a perspective view diagram illustrating an example slide rack carousel base with rack spacers according to an embodiment of the invention.

FIG. 6 is a perspective view diagram illustrating an example slide rack carousel base 10 with rack spacers 210 according to an embodiment of the invention. In the illustrated embodiment, the base 10 has an upper surface with a more external flat portion and a more central angled portion upon which the slide racks 300 are to be positioned. The carousel includes a plurality of rack spacers 210 that extend upward from the upper surface of the base 10. Adjacent rack spacers 210 form a rack slot 220 that is configured to receive a wide variety of different types of slide racks 300 made by different manufactures. In one embodiment, the slide racks 300 may be of different heights and/or widths and still fit within at least one rack slot 220.

Figure 7:
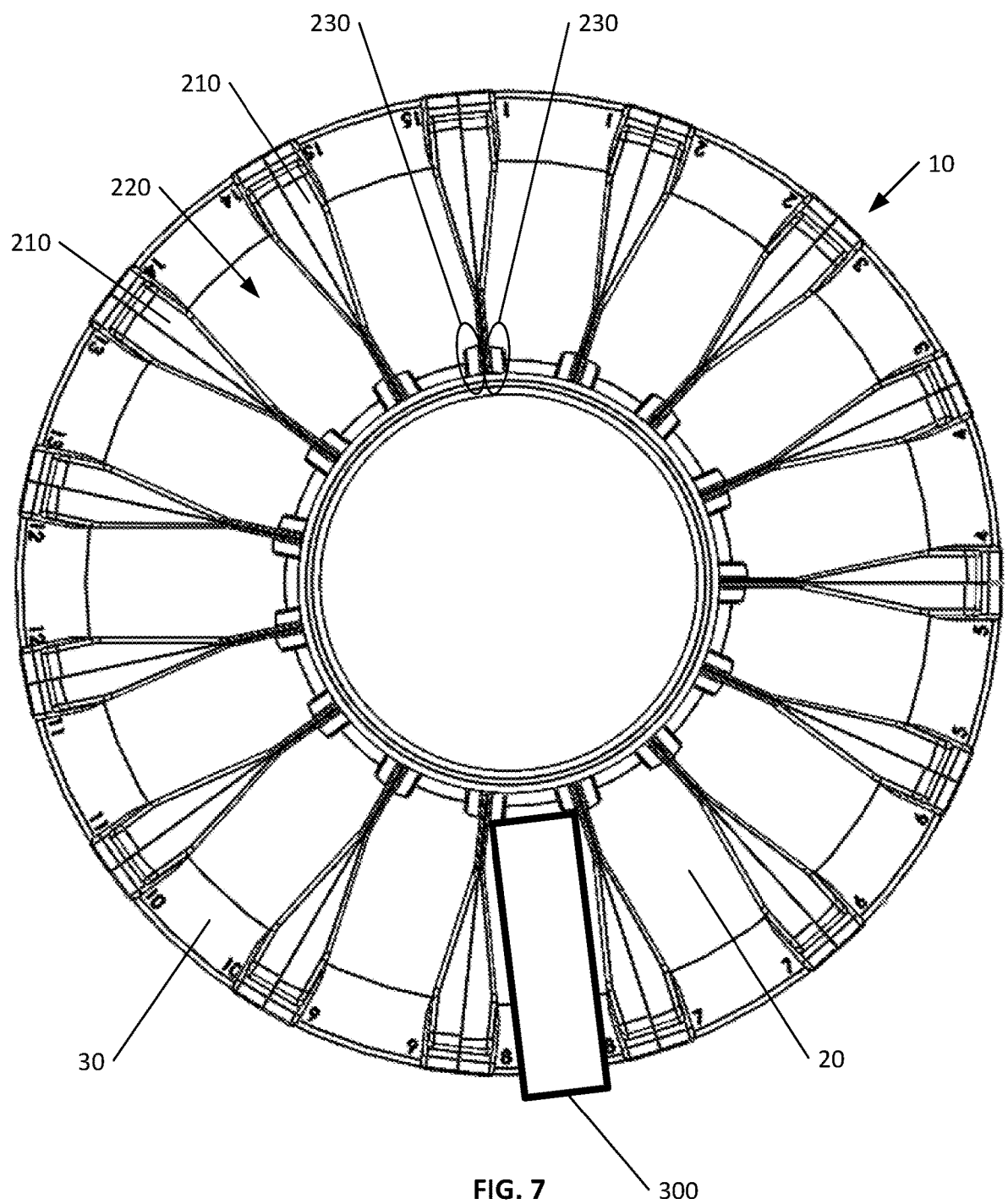
FIG. 7 is a top view diagram illustrating an example slide rack carousel base with rack spacers according to an embodiment of the invention.

FIG. 7 is a top view diagram illustrating an example slide rack carousel base 10 with rack spacers 210 according to an embodiment of the invention. In the illustrated embodiment, each rack spacer 210 comprises a first rack stopper 230 on a first side and a second rack stopper 230 on a second side. Each of the first and second rack stoppers 230 of a single rack spacer 210 face different rack slots 200. Accordingly, a first rack stopper 230 of a first rack spacer 210 and a second rack stopper 230 of a second rack spacer 210 face each other. Advantageously, the distance between the first rack stopper 230 and the second rack stopper 230 of a particular rack slot 220 is less than the width of a slide rack 300. In this fashion, the combination of opposing first rack stopper 230 and second rack stopper 230 prevent a slide rack 300 from traveling any further toward the center of the slide rack 300 carousel. In one embodiment, at least one of the facing first and second rack stoppers 230 include a rack stopper gap 240 configured to facilitate detection of the presence of a slide rack 300.

In one embodiment, one or more of the slide rack stoppers 230 is configured with a detector 250 oriented in a slide rack 300 stopper gap 240 that is positioned to determine if a slide rack 300 occupies the rack slot 220 in which the slide rack 300 stopper 230 is positioned. The digital scanning apparatus may receive a signal from one or more detectors 250 of a single rack slot 220 and based on the signal or signals, make a determination regarding the presence or absence of a slide rack 300 in the particular rack slot 220. Additionally, the digital scanning apparatus may also illuminate a multicolor status indicator light associated with the particular rack slot 220 based on the determination regarding the presence or absence of a slide rack 300 in the particular rack slot 220.

2. Example Slide Racks

Figure 8:
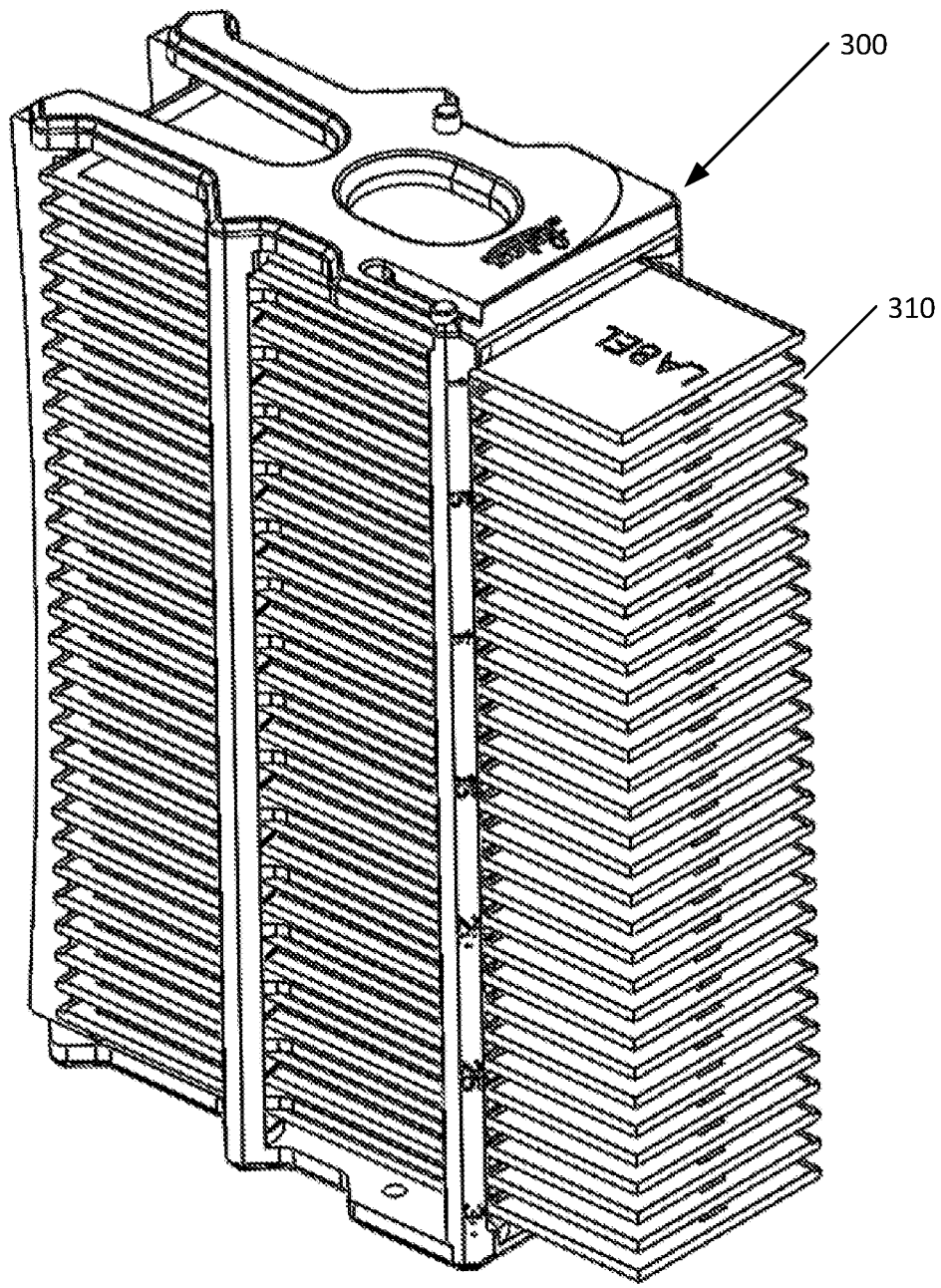
FIG. 8 is a perspective view diagram illustrating an example slide rack with glass slides according to an embodiment of the invention.
Figure 9:
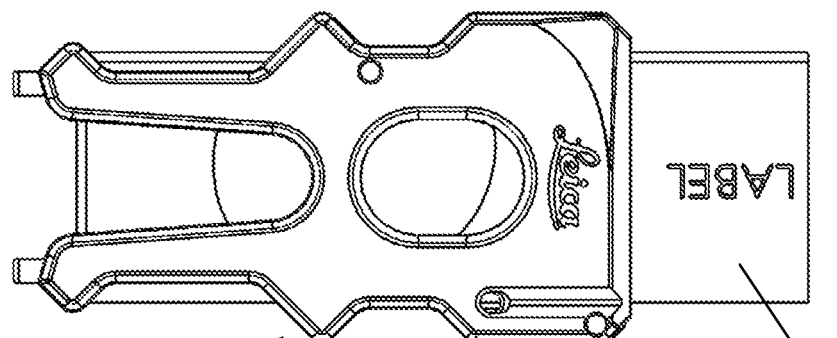
FIG. 9 is a top view diagram illustrating an example slide rack with glass slides according to an embodiment of the invention.
Figure 10:
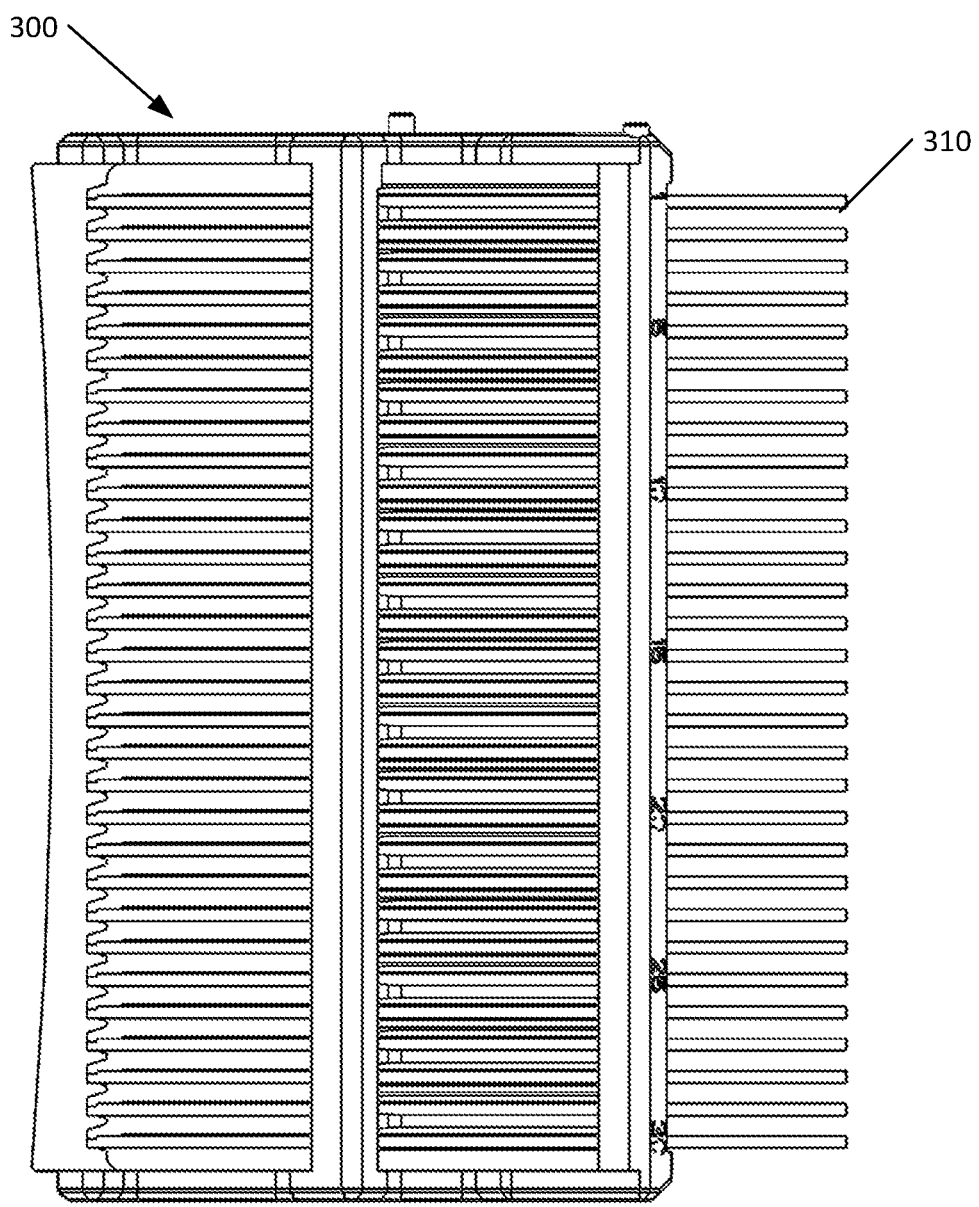
FIG. 10 is a side view diagram illustrating an example slide rack with glass slides according to an embodiment of the invention.

FIGS. 8, 9 and 10 are perspective, top and side view diagrams illustrating an example slide rack 300 with glass slides 310 according to an embodiment of the invention. In the illustrated embodiment, the slide rack 300 if from a first manufacturer.

Figure 11:
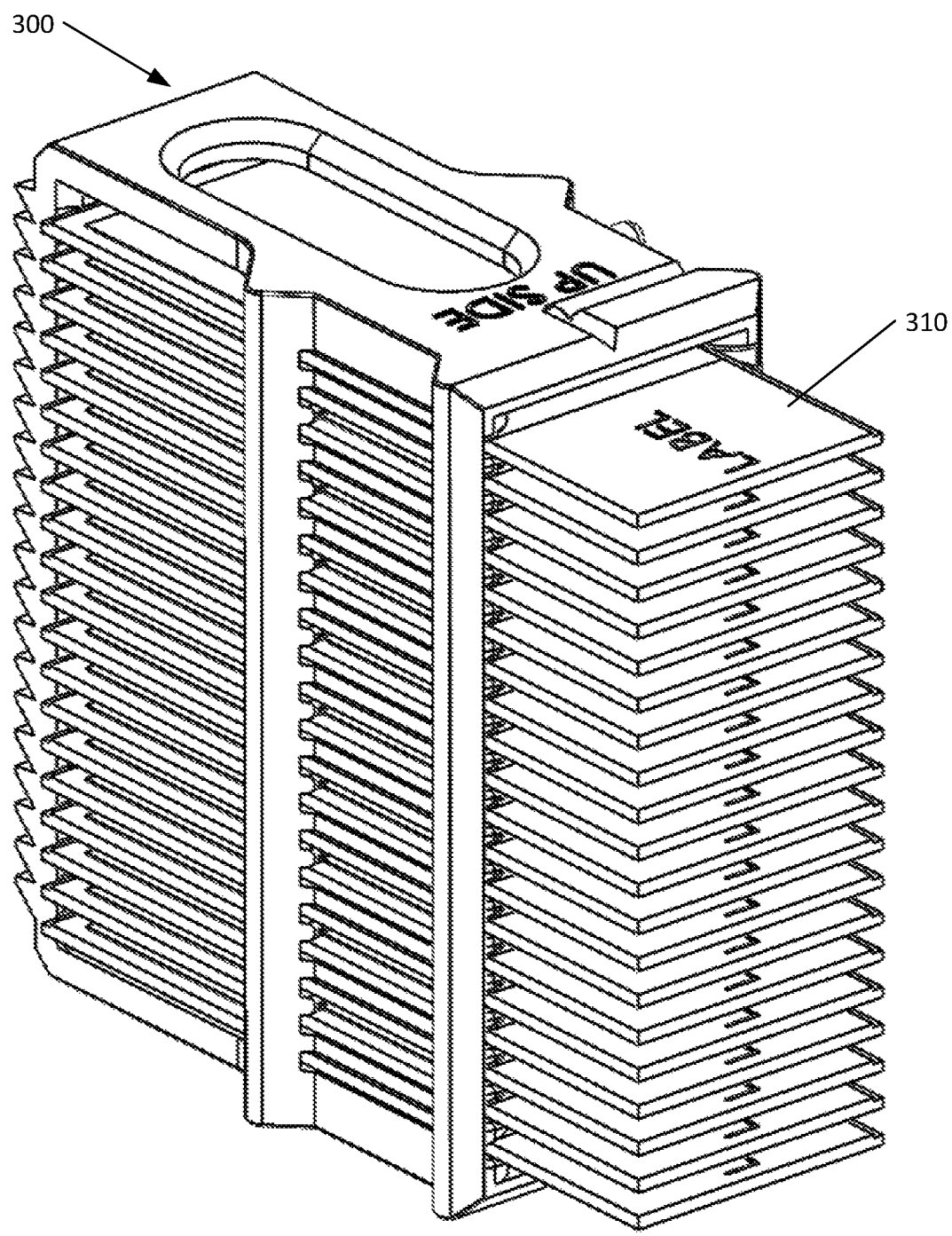
FIG. 11 is a perspective view diagram illustrating an example slide rack with glass slides according to an embodiment of the invention.
Figure 12:
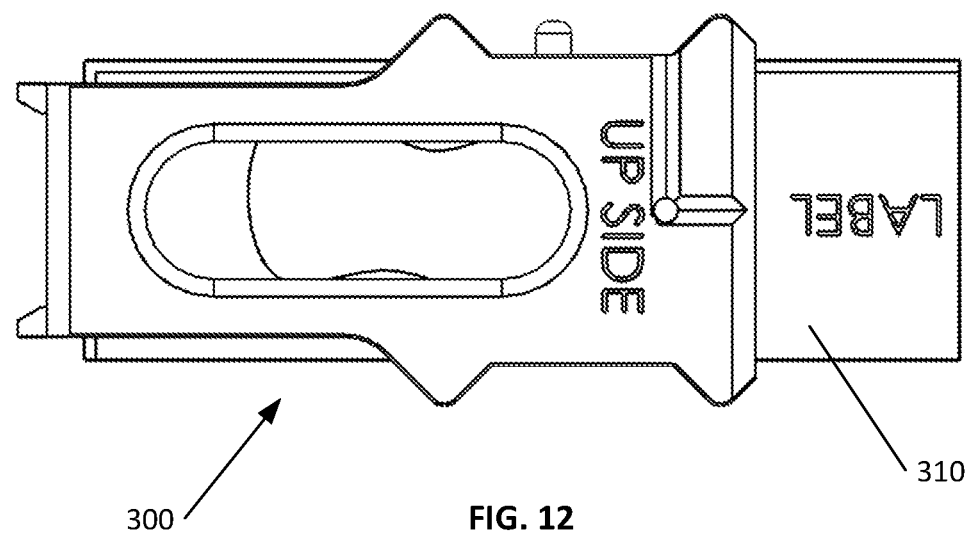
FIG. 12 is a top view diagram illustrating an example slide rack with glass slides according to an embodiment of the invention.
Figure 13:
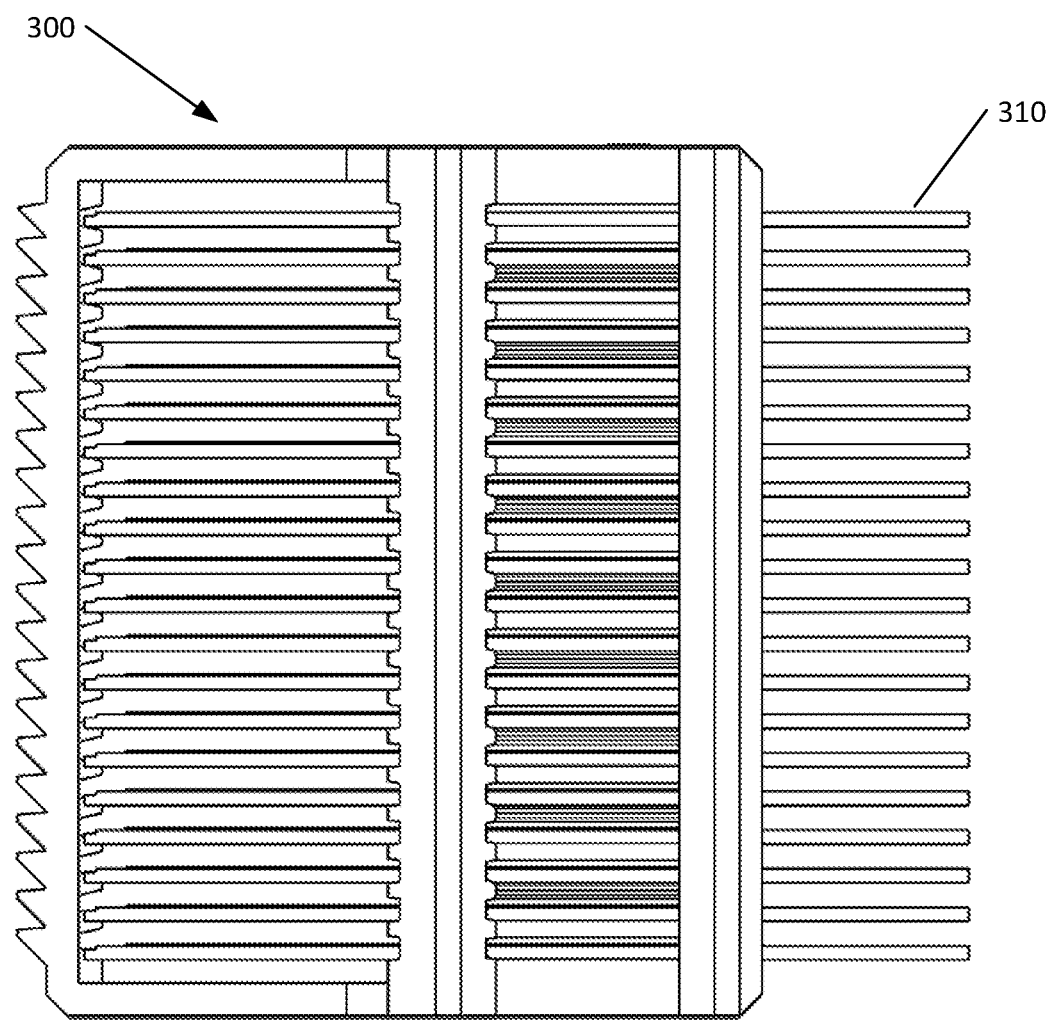
FIG. 13 is a side view diagram illustrating an example slide rack with glass slides according to an embodiment of the invention.

FIGS. 11, 12 and 13 are perspective, top and side view diagrams illustrating an example slide rack 300 with glass slides 310 according to an embodiment of the invention. In the illustrated embodiment, the slide rack 300 if from a second manufacturer.

4. Example Slide Rack Carousel Populated with Slide Racks

Figure 14:
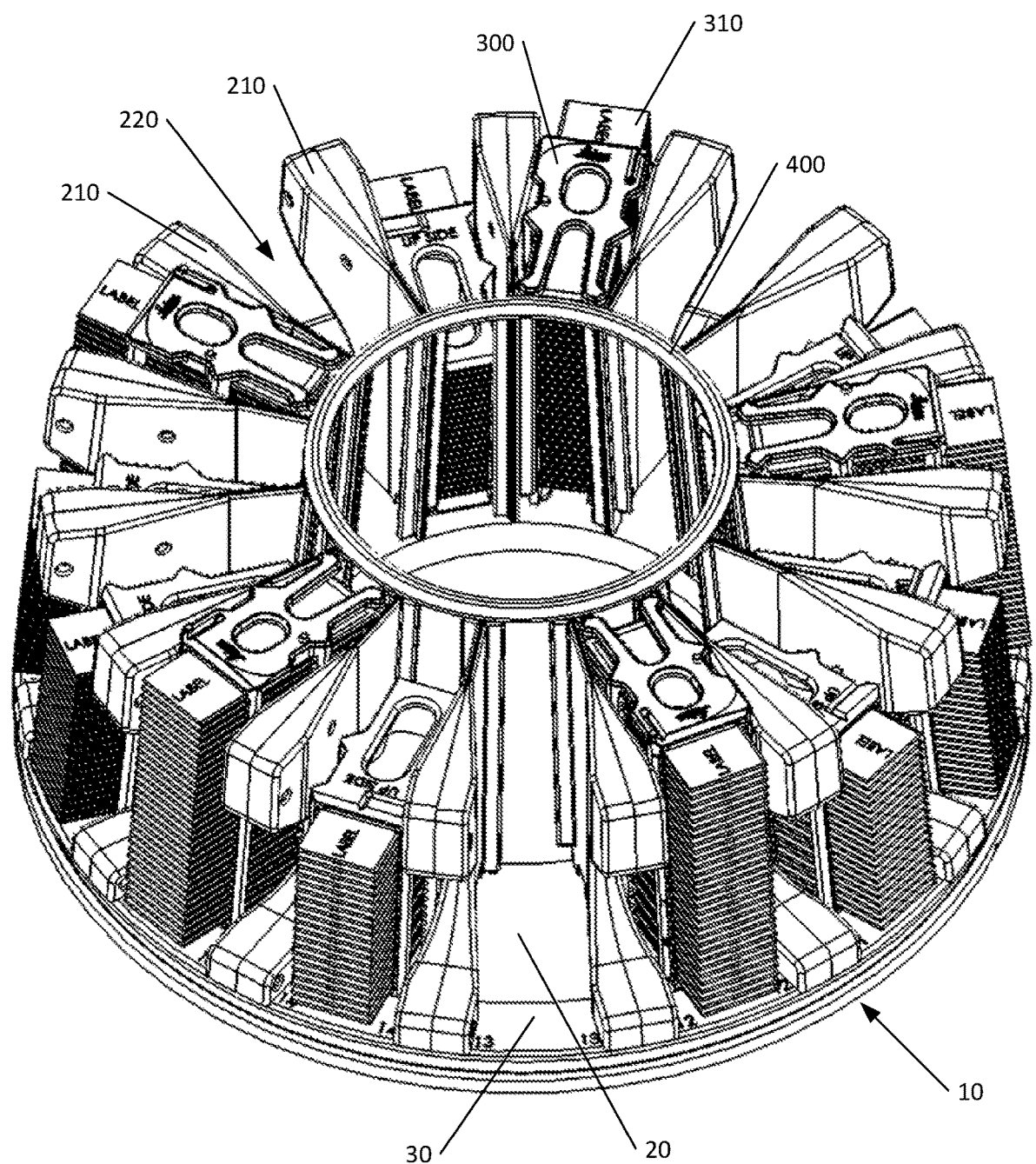
FIG. 14 is a perspective view diagram illustrating an example slide rack carousel base with rack spacers and slide racks with glass slides according to an embodiment of the invention.
Figure 15:
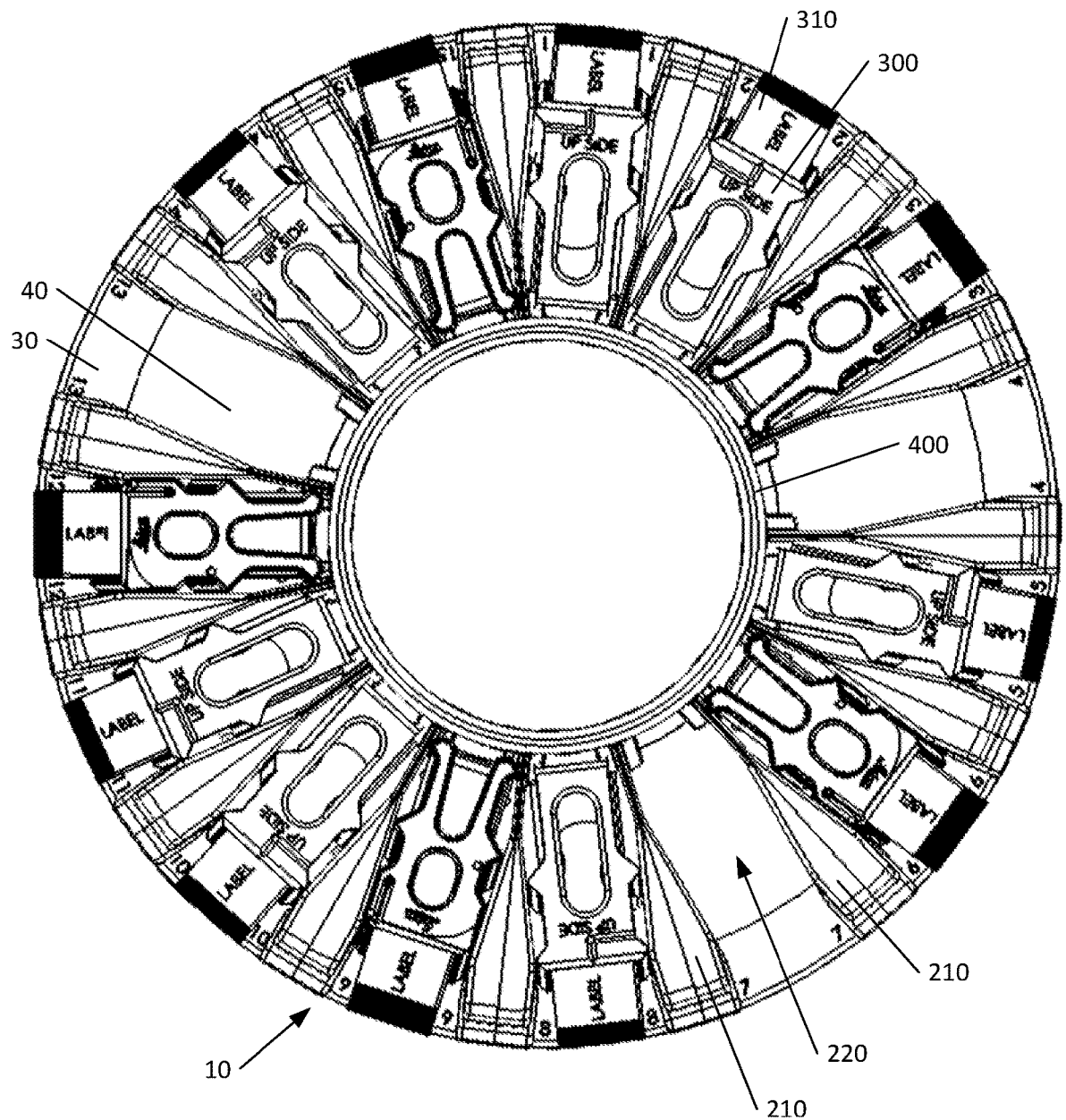
FIG. 15 is a top view diagram illustrating an example slide rack carousel base with rack spacers and slide racks with glass slides according to an embodiment of the invention.

FIGS. 14 and 15 are perspective and top view diagrams illustrating an example slide rack carousel base 10 with rack spacers 210 and different height slide racks 300 with glass slides 310 according to an embodiment of the invention. In the illustrated embodiments, the carousel comprises a base having a flat upper surface portion 30 and an angled upper surface portion 20. Rack spacers 210 are attached to the upper surface of the base 10 and extend upward from the upper surface of the base 10. Adjacent rack spacers 210 define a rack slot 220 into which a slide rack 300 can be positioned such that slide rack 300 rests primarily on the angled portion of the upper surface of the base 10. Glass slides 310 occupy various slots in the slide rack 300 and the glass slides 310 are advantageously positioned at an angle in accordance with the angle of the upper surface of the base 10. Additionally, the carousel comprises a central ring 400 that is secured to an upper portion of each of the plurality of rack spacers 210.

4. Example Embodiments

In one embodiment, a digital slide scanning apparatus carousel for holding a plurality of glass slide 310 racks 300 includes a base having a lower surface, an upper surface and an exterior edge. The exterior edge of the base 10 is generally circular in shape when viewed from a top view perspective. The carousel also includes a plurality of rack spacers 210 extending upward from the base 10. This configuration causes adjacent pairs of rack spacers 210 to define a rack slot 220 bordered on three sides by the base 10, a first side of a first rack spacer 210 and a second side of a second rack spacer 210. Each rack spacer 210 comprises a first rack stop on a first side and a second rack stop on a second side. Additionally, at least a portion of the upper surface of the base 10 angles downward from a more external position on the base 10 toward a more central position on the base 10 and the angle is at least 1 degree. This angle advantageously causes any vibration imposed on the glass slides 310 in the carousel to urge the glass slides 310 further into their respective slide racks 300. Additionally, the base 10 is configured to rotate 360 degrees in either direction.

The digital slide scanning apparatus carousel may also include a motor configured to rotate the carousel in either direction. In one embodiment, the angled portion of the upper surface of the base 10 is angled at least 5 degrees. Additionally, in one embodiment each rack stop comprises a slide rack 300 detector configured to detect the presence of a slide rack 300 in the slide rack slot 220.

In one embodiment, the carousel is configured with fifteen separate rack slots 200. Advantageously, in one embodiment, each rack slot 220 may be numbered and include a multi-color status indicator light. In one embodiment, an exterior portion of the upper surface of the base 10 that is adjacent to the exterior edge is substantially flat and the angled portion of the upper surface of the base 10 is more central than the substantially flat portion. In one embodiment, the base 10 forms a ring shape.

Advantageously, in on embodiment, each of the plurality of rack spacers 210 is secured to the base 10. And in one embodiment, the carousel also includes a ring 400 that is secured to an upper portion of each of the plurality of rack spacers 210. Additionally, in one embodiment a first rack spacer 210 and a second rack spacer 210 define a first rack slot 220 and the first rack stopper 230 of the first rack spacer 210 faces the second rack stopper 230 of the second rack spacer 210. In this embodiment, a distance between a first rack stopper 230 and the second rack stopper 230 is less than a width of a slide rack 300. This advantageously causes a slide rack 300 disposed at an angle on the upper surface of the base 10, to be biased for vibration induced movement toward the center of the carousel, with such potential vibration induced movement prevented by the combination of the first rack stopper 230 and the second rack stopper 230.

4. Example Digital Slide Scanning Apparatus

The various embodiments described herein may be implemented using a digital pathology scanning device such as described with respect to FIGS. 16A-16D.

Figure 16A:
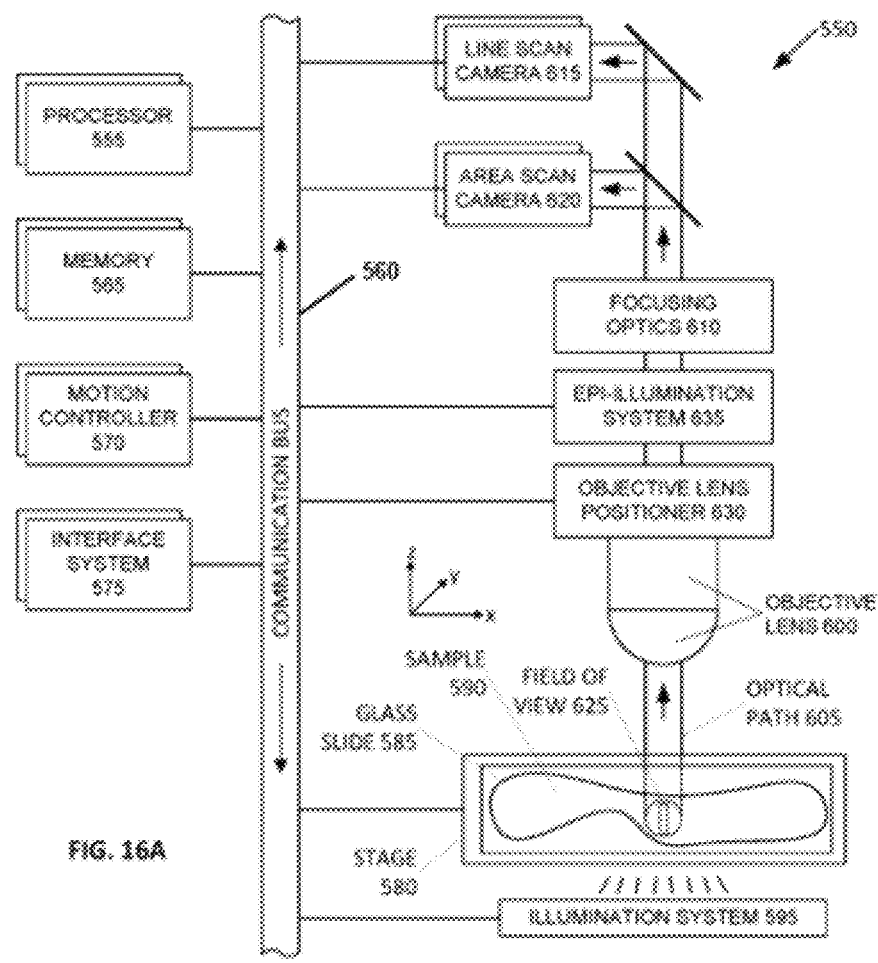
FIG. 16A is a block diagram illustrating an example processor enabled device that may be used in connection with various embodiments described herein.

FIG. 16A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system or a digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices such as an image server system, an operator station, a user station, and an administrative server system that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In an embodiment, the scanner system 550 may employ a high precision and tightly coordinated X-Y grid to aid in the location of the sample 590 on the movable stage 580. In an embodiment, the movable stage 580 is a linear motor based X-Y stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20X objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion of the sample 590 or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

Figure 16B:
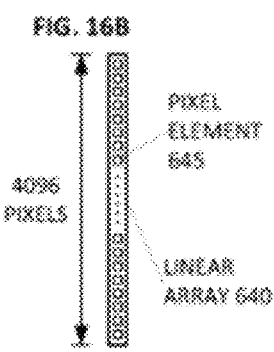
FIG. 16B is a block diagram illustrating an example line scan camera having a single linear array.

FIG. 16B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figure 16C:
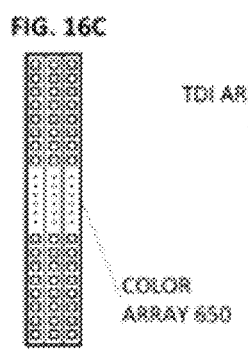
FIG. 16C is a block diagram illustrating an example line scan camera having three linear arrays.

FIG. 16C illustrates a line scan camera having three linear arrays, each of which may be implemented as a CCD array. The three linear arrays combine to form a color array 650. In an embodiment, each individual linear array in the color array 650 detects a different color intensity, (e.g., red, green, or blue). The color image data from each individual linear array in the color array 650 is combined to form a single field of view 625 of color image data.

Figure 16D:
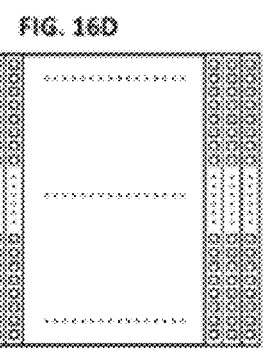
FIG. 16D is a block diagram illustrating an example line scan camera having a plurality of linear arrays.

FIG. 16D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A carousel for holding a plurality of glass slide racks in a digital slide scanning apparatus, the carousel comprising:
    a carousel base having a lower surface on a first side of the carousel base, an upper surface on a second side of the carousel base that is opposite the first side, and an exterior edge between the lower surface and the upper surface on a side of the carousel base that intersects the first side and the second side, wherein the exterior edge of the carousel base is generally circular from a top view perspective,
    wherein at least a portion of the upper surface of the carousel base is angled downward towards a center of the carousel base, and wherein the angle is at least 1 degree, wherein the upper surface is configured to receive at least one glass slide rack of the plurality of glass slide racks to bias the at least one slide rack towards the center of the carousel base, and
    wherein the carousel base is configured to rotate 360 degrees in at least one direction.

2. The carousel of claim 1, wherein the angle is between 1 and 5 degrees.

3. The carousel of claim 1, wherein the angle is at least 5 degrees.

4. The carousel of claim 1, wherein an exterior portion of the upper surface of the base, adjacent the exterior edge, is substantially flat, and wherein the angled portion of the upper surface of the carousel base is closer to the center of the carousel base than the exterior portion.

5. The carousel of claim 1, wherein the carousel base forms a ring shape.

6. The carousel of claim 1, wherein the exterior edge is orthogonal to the first side and the second side.

7. The carousel of claim 1, wherein a perimeter edge of the upper surface has a bevel.

8. The carousel of claim 1, further comprising a plurality of rack spacers extending from the upper surface away from the lower surface, wherein each pair of adjacent ones of the plurality of rack spacers defines a rack slot therebetween.

9. The carousel of claim 8, wherein each of the plurality of rack spacers comprises a rack stopper that extends from the rack spacer towards an adjacent one of the plurality of rack spacers.

10. The carousel of claim 9, wherein each of the plurality of rack spacers comprises two rack stoppers, wherein a first one of the two rack stoppers extends from the rack spacer towards a first adjacent one of the plurality of rack spacers on a first side of the rack spacer, and wherein a second one of the two rack stoppers extends from the rack spacer towards a second adjacent one of the plurality of rack spacers on a second side of the rack spacer that is opposite the first side of the rack spacer.

11. The carousel of claim 9, wherein a width of each rack stopper is less than a minimum width of each rack slot, such that a stopper gap exists between each pair of adjacent rack spacers.

12. The carousel of claim 11, further comprising a detector oriented in each stopper gap, wherein each detector is configured to detect whether or not a respective rack slot is occupied.

13. A digital slide scanning apparatus comprising:
    the carousel of claim 1; and
    a motor configured to rotate the carousel in the at least one direction.

14. The digital slide scanning apparatus of claim 13, wherein the lower surface of the carousel base has a cutout, and wherein the digital slide scanning apparatus further comprises:
    a machine base; and
    three or more v-wheel bearings that engage the carousel base in the cutout to secure the carousel base to the machine base during rotation of the carousel.

15. The digital slide scanning apparatus of claim 14, wherein at least one of the three or more v-wheel bearings is adjustable.

16. The digital slide scanning apparatus of claim 14, wherein three of the three or more v-wheel bearings are positioned in a triangular orientation.

17. The digital slide scanning apparatus of claim 13, further comprising:
- a rotor; and
- a belt in contact with the rotor and a portion of the carousel base,
- wherein the motor is configured to drive the rotor in the at least one direction, and
- wherein rotation of the rotor in the at least one direction, driven by the motor, causes the belt to move the carousel base in the first direction.

18. The digital slide scanning apparatus of claim 17, wherein the motor is configured to drive the rotor in each of two opposite directions.

19. The digital slide scanning apparatus of claim 17, wherein the exterior edge comprises a belt recess that extends around the carousel base, and wherein the belt contacts the carousel base within the belt recess.

20. The digital slide scanning apparatus of claim 13, further comprising a plurality of multi-color status indicator lights, wherein each of the plurality of multi-color status indicator lights indicates a status of one of a plurality of rack slots on the carousel.

* * * * *